J. BECKER.
FOCUSING CAMERA.
APPLICATION FILED MAR. 24, 1916.

1,240,651.

Patented Sept. 18, 1917.

Inventor
Joseph Becker

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

FOCUSING-CAMERA.

1,240,651.     Specification of Letters Patent.     Patented Sept. 18, 1917.

Original application filed August 11, 1900, Serial No. 26,647. Divided and this application filed March 24, 1916. Serial No. 86,366.

*To all whom it may concern:*

Be it known that I, JOSEPH BECKER, a citizen of the United States, residing at Washington, District of Columbia, have invented new and useful Improvements in Focusing-Cameras, of which the following is a specification.

The present patent application, identified for convenience of reference in my related applications or patents as Case Ag, is division one of my prior application, Case A, Serial No. 26,647, filed August 11, 1900, now Patent 1,178,474, issued April 4, 1916.

The present invention consists in the independently patentable type of optical focuser characterized by the presence of an approximately accurate but direct non-radial pivoted cam, such as in the focusers of Figures 28, 55, 57, 57$^a$, and 58 of my said Case A.

Fig. 1 camera.

Figure 1:
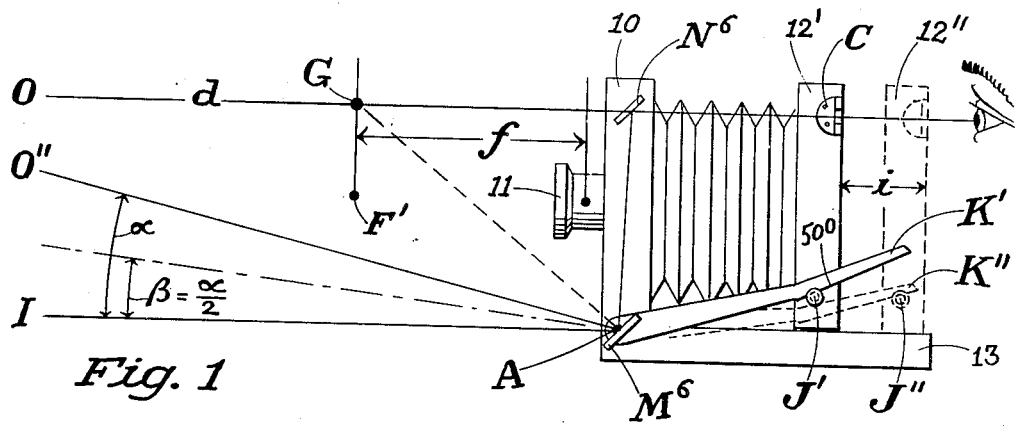
Fig. 1 shows, in side elevation, the non-radial direct-cam focuser of Fig. 28 in my said Case A.

The camera of Fig. 1 comprises a bed 13 with an upright extension 10 which serves as a support for three optical elements, to wit: first, the eye mirror $N^6$ fixed near the top; secondly, the object mirror $M^6$ pivoted, near the bottom, at A; thirdly, the camera lens 11 whose external principal focus is at F', and whose focal length equals f.

The bed 13 is provided on the inside with suitable slideways for guiding a carriage on which is rigidly connected the image frame 12'. This frame 12' supports, near the top, a peep sight C; and, near the bottom, a pin J'. On pin J' bears the cam arm K' which is pivoted at A and whose weight is sufficient to keep it in working contact with pin J'.

On cam arm K' is rigidly fixed the object mirror $M^6$ which, therefore, rotates with and at the same rate as arm K'.

Figure 2:
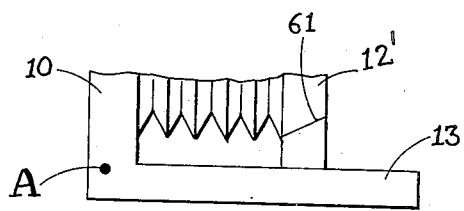
Figs. 2 and 3 are explanatory of Fig. 1.
Figure 3:
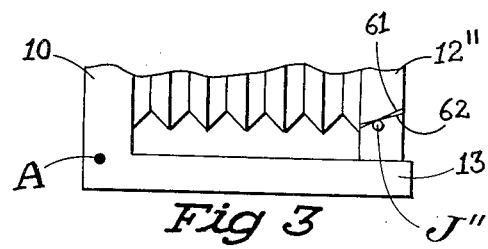

Fig. 1 shows the movable image frame 12' in two positions, to wit: in a full line position 12', separately shown in Fig. 2; and in a dotted position 12'', separately shown in Fig. 3. The full line position 12' is that which sets the camera in focus on left infinity and the dotted position 12'' is that which sets it in focus on a relatively close object point.

When the camera is in focus on left infinity, its image frame is in the full line position 12', and the object mirror $M^6$ should be exactly parallel to the eye mirror $N^6$, as shown in Fig. 1, so that the lower line of sight shall proceed along AI parallel to the upper line CGO, to meet it at infinity.

When the camera is in focus on the close object point, its image frame is shifted from 12' to 12'', Fig. 1, through a distance $i$, which, in the case illustrated, is 10/27 of f. That object point, on CG produced, which is in focus when the image frame is at 12'', must be to the left of point G at a distance $d$ equal to 27/10 of f. That is to say, $$i = \frac{10}{27} f.$$

$$d = \frac{27}{10} f.$$

$$i.d = f^2. \quad (1)$$

which is identical with equation 1 of my said Case A.

The direction of such close object point focused on from A is indicated by AO'' and the angle IAO'' or alpha ($\alpha$) is the ray inclination for such close object point.

To secure coincidence of the mirror image of such close object point with itself, the mirror $M^6$ must be rotated clockwise through an angle K'AK'' equal to one-half alpha $\left(\frac{\alpha}{2}\right)$, that is to say, equal to beta ($\beta$), and this determines another point in the rubbing cam edge 500.

Any desired number of other points of the cam edge 500 may be found, in the same way, and they will be located along a curve which does not depart much from a straight edge if the closest object point focused on is not too close.

If the lens, lens mount, and camera frames, and all the focuser elements could be made without error of a certain specified size, exactly as in Fig. 1, which is to scale, the parts might be made separately and assembled with the assurance of securing correct coöperation.

Errors, however, are unavoidable in current practice and are most easily disposed of by final adjustment, as by a slight shift in the location of pin J' on frame 12'; because pin J' can always be located to secure exact two-point correspondence between the mirrors and the camera lens for any given form of cam edge 500.

Such exact two-point correspondence may be secured as follows: The camera is first sharply focused with the ground glass on the distant point, under specially favorable conditions; arm K' is then set by hand and held so the image in mirror N will register or match, and while the mirror arm is so held a marking point is run along the lower cam edge of the arm to scribe a line 61 on frame 12, as shown in Fig. 2.

The camera is next sharply focused on the close point and the mirror arm is set and held to secure matching for the close point. The marking point is again run along the lower cam edge of the arm to trace a second line 62, Fig. 3, which crosses the first line 61 at the place where the drive pin J' should be set. The upper rubbing surface of the pin J' should be tangent to the two lines 61, 62 thus traced on the image frame in position 12'', Fig. 3.

As it is often difficult to set the drive pin exactly in the place indicated, it is better to set it a little high and then to correct the cam edge by filing.

If the scribed lines 61, 62 do not cross on the plate frame 12'' or at a place where the drive pin can be conveniently fastened the pin should be set on the plate frame a little above the higher of the two lines and the cam edge should then be suitably corrected by filing as before; that is, by making two of its points correct and then removing the intermediate material to join the correct points by a straight edge.

Figure 4:
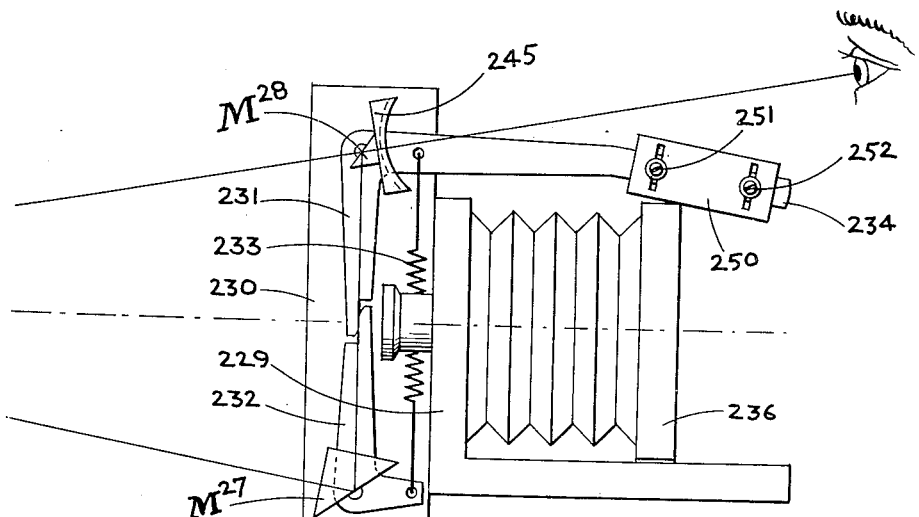
Fig. 4 shows, in side elevation, the non-radial and adjustable direct-cam focuser of Fig. 57$^a$ in my said Case A.

Filing is avoided by making the cam edge on a separate part adjustable with respect to the mirror arm K', as in Fig. 4.

*Fig. 4 camera.*

The camera of Fig. 4 is of the type seen in Fig. 57ª, Case A, specially adapted to insure that the object point sighted on shall be the central point of the camera field, and it, therefore, comprises two mirrors on opposite sides of the lens axis in an axial plane and both pivoted to rotate equally in opposite directions so the rays of light to the two shall at all times be in an axial plane and equally inclined to the lens axis. The mirrors $M^{27}$ and $M^{28}$ are pivotally mounted on a shelf 230 fastened to the lens frame 229 of the camera, and are provided with equal arms 231, 232 kept in contact by the tension of a spring 233, which also acts to keep the cam arm extension 234 in working contact with the upper edge of the plate frame 236, the mechanism being of the same direct cam type seen in Fig. 1.

When the two mirrors are pivoted as in Fig. 4 they each act as if coöperating with an imaginary fixed mirror set in the lens axis, and, therefore, the elements of arm $D^n$ in the theoretical form of this combination, Fig. 23, Case A, must be determined as if the focuser comprised a stationary eye mirror on the lens axis coöperating with the pivoted mirror $M^{28}$; and no attention is paid to the pivoted mirror $M^{27}$.

The cam edge is formed on a cam plate 250 which is adjustably clamped to the arm 234 by screws 251, 252.

NOTE 1.—The radial cam focuser of Fig. 27, Case A, is not capable of securing more than two-point correspondence, and it, therefore, should not be confounded with the theoretically accurate radial cams in Fig. 1 or Fig. 18 of my said Case A, but must be considered as a special case of the present direct-cam focuser; for, when made accurately, the cam is curved or non-radial.

NOTE 2.—The camera seen in the present Fig. 4 is substantially identical with the camera shown in a photograph annexed to and forming part of the affidavit which I filed August 14, 1900, in my said Case A, and which shows the inventor, that is to say, myself, in the act of using the same.

NOTE 3.—I am aware that Garceau, in French Patent No. 256,838, filed June 1, 1896, shows, in his Fig. 7, a cam focuser with mirrors and with the cam edge straight and radial apparently as in Fig. 27 of my Case A, but this Fig. 27 of my Case A is arranged with the straight cam edge almost horizontal to secure exact correspondence between the mirrors and the camera lens for two different distances of the object point to be focused on; whereas the Garceau Fig. 7 is calculated and arranged with the straight cam edge almost vertical to secure exact correspondence between the mirrors and the camera lens for the point at infinity and cannot be made exact for a close object point except by departing from the Garceau specification, as by making the cam non-radial.

NOTE 4.—I am aware that Garceau, in the same said French Patent No. 256,838, filed June 1, 1896, shows in his Figs. 5 and 6 two different optical focusers of a type having no mirrors, and each provided with direct-cam gear; but these different devices are calculated and arranged to be accurate for the object point at infinity without reference to any close object point in substantially the same manner as in Fig. 7 mentioned above in Note 3, and this cannot secure more than one-point correspondence between the focuser and the camera lens except in the theoretical but practically inconvenient form of Fig. 5, a fact which is admitted by Garceau himself.

What I claim as my invention and desire to secure by Letters Patent is:

1. The combination with a photographic camera comprising relatively movable parts adapted to be relatively moved to set the camera in focus on an object point of the camera field; of an auxiliary optical focuser, for said camera, comprising means for sighting convergingly from two laterally separated points of such focuser at the same said object point of the camera field; said focuser comprising also relatively movable parts that are adapted to be moved to change the relative inclination of the said sighting directions; structural connections between the said relatively movable focuser parts on the one hand, and the said relatively movable camera parts on the other hand, to insure that to each relative position of the said camera parts shall correspond only one relative inclination of the said sighting directions; said structural connections comprising an abutment on one of said relatively movable camera parts and an arm pivotally mounted on the other of said relatively movable camera parts; said arm having a non-radial cam edge adapted to have combined sliding and rotating engagement with the said abutment.

2. The combination with a photographic camera comprising relatively movable parts adapted to be relatively moved to set the camera in focus on an object point of the camera field; of an auxiliary optical focuser, for said camera, comprising means for sighting convergingly from two laterally separated points of such focuser at the same said object point of the camera field; said focuser comprising also relatively movable parts that are adapted to be moved to change the relative inclination of the said sighting directions; structural connections between the said relatively movable focuser parts on the one hand, and the said relatively movable camera parts on the other hand, to insure that to each relative position of the said camera parts shall correspond only one relative inclination of the said sighting directions; said structural connections comprising an abutment on one of said relatively movable camera parts, and an arm pivotally mounted on the other of said relatively movable camera parts; said arm having a non-radial cam edge adapted to have combined sliding and rotating engagement with the said abutment as the said relatively movable camera parts are relatively moved; said different camera and focuser elements being proportioned and arranged to secure exact correspondence between the camera and the focuser for two different distances of the said object point.

3. The combination with a photographic camera comprising relatively movable parts adapted to be relatively moved to set the camera in focus on an object point of the camera field; of an auxiliary optical focuser, for said camera, comprising mirrors for sighting convergingly from two laterally separated points of such focuser at the same said object point of the camera field; said focuser comprising also relatively movable parts that are adapted to be moved to change the relative inclination of the said sighting directions; structural connections between the said relatively movable focuser parts on the one hand, and the said relatively movable camera parts on the other hand, to insure that to each relative position of the said camera parts shall correspond only one relative inclination of the said sighting directions; said structural connections comprising an abutment on one of the said relatively movable camera parts; an arm pivotally mounted on the other of said relatively movable camera parts and having a cam edge adapted to have combined sliding and rotating engagement with said abutment so that to each relative position of the said camera parts shall correspond one, and only one, inclination of the said pivoted cam arm; said pivoted cam arm being, moreover, composed of elements whose relative position may be changed to permit of changing the correspondence that exists between the focusing displacements in the said camera and the sighting inclinations in the said focuser as required to suit the particular camera lens used.

4. The combination with a photographic camera comprising a support for the camera lens, a support for the image receiving plane of the camera and guides that permit of changing the relative position of said two supports as may be necessary to set the camera in focus on an object point of the camera field; of an optical focuser for said camera comprising a mirror pivoted on one of the said two camera supports, an abutment on the other of the said two camera supports and an arm fixed to the said mirror to rotate the same; said arm having a non-radial cam edge adapted to have combined sliding and rotating engagement with the said abutment so that to each relative position of said camera parts shall correspond one, and only one, inclination of the said pivoted cam arm.

In testimony whereof, I have signed my name to this specification.

JOSEPH BECKER.